United States Patent
Nakano et al.

(10) Patent No.: US 8,519,625 B2
(45) Date of Patent: Aug. 27, 2013

(54) LIGHT QUANTITY CONTROL APPARATUS AND STORAGE MEDIUM

(75) Inventors: Takahiro Nakano, Kariya (JP); Takahito Nishii, Nagoya (JP); Tsutomu Kamizono, Nagoya (JP); Daisuke Nishitani, Kariya (JP)

(73) Assignee: Denso Corporation, Kariya (JP)

( * ) Notice: Subject to any disclaimer, the term of this patent is extended or adjusted under 35 U.S.C. 154(b) by 129 days.

(21) Appl. No.: 13/315,434

(22) Filed: Dec. 9, 2011

(65) Prior Publication Data

US 2012/0146506 A1    Jun. 14, 2012

(30) Foreign Application Priority Data

Dec. 10, 2010    (JP) .................................. 2010-275815

(51) Int. Cl.
*B60Q 1/00*    (2006.01)

(52) U.S. Cl.
USPC .......................................... 315/77; 340/425.5

(58) Field of Classification Search
None
See application file for complete search history.

(56) References Cited

U.S. PATENT DOCUMENTS

| 7,355,528 | B2 * | 4/2008 | Yamane et al. | 340/995.13 |
| 7,683,767 | B2 * | 3/2010 | Hara et al. | 340/438 |
| 2006/0015219 | A1 * | 1/2006 | Kynast et al. | 701/1 |
| 2006/0044818 | A1 | 3/2006 | Amagasa | |
| 2008/0136609 | A1 * | 6/2008 | Nakatani et al. | 340/425.5 |
| 2011/0050102 | A1 | 3/2011 | Bars et al. | |

FOREIGN PATENT DOCUMENTS

| JP | 2004-500279 | 1/2004 |
| JP | 2005-335485 | 12/2005 |
| JP | 2006-069382 | 3/2006 |
| JP | 2006-142900 | 6/2006 |
| JP | 2006-164743 | 6/2006 |
| JP | 2007-099077 | 4/2007 |
| JP | 2008-143505 | 6/2008 |
| JP | 2011-046374 | 3/2011 |
| WO | WO 01/70538 A2 | 9/2001 |

OTHER PUBLICATIONS

Office Action issued Jan. 10, 2013 in corresponding Japanese Application No. 2010-275815 with English translation.

* cited by examiner

*Primary Examiner* — Crystal L Hammond
(74) *Attorney, Agent, or Firm* — Harness, Dickey & Pierce, PLC

(57) ABSTRACT

A light quantity control apparatus, which controls light quantity of a light of a vehicle, includes a traffic-jam-information obtaining unit obtaining traffic-jam-information including information on positions and on presence/absence of a traffic jam, a vehicle-position obtaining unit obtaining a position of a vehicle, a traffic-jam identifying unit identifying whether the vehicle is in a traffic jam based on the traffic-jam-information and the position of the vehicle, a traffic-jam-time light quantity control unit decreasing the light quantity compared with a normal time if the vehicle is in a traffic jam, an urban-district obtaining unit obtaining information on whether or not the vehicle is in an urban district or near an intersection, and an urban-district-traveling-time light quantity control unit decreasing the light quantity compared with a case where the vehicle is in an area other than urban districts and intersections if the vehicle is in the urban district or near an intersection.

11 Claims, 6 Drawing Sheets

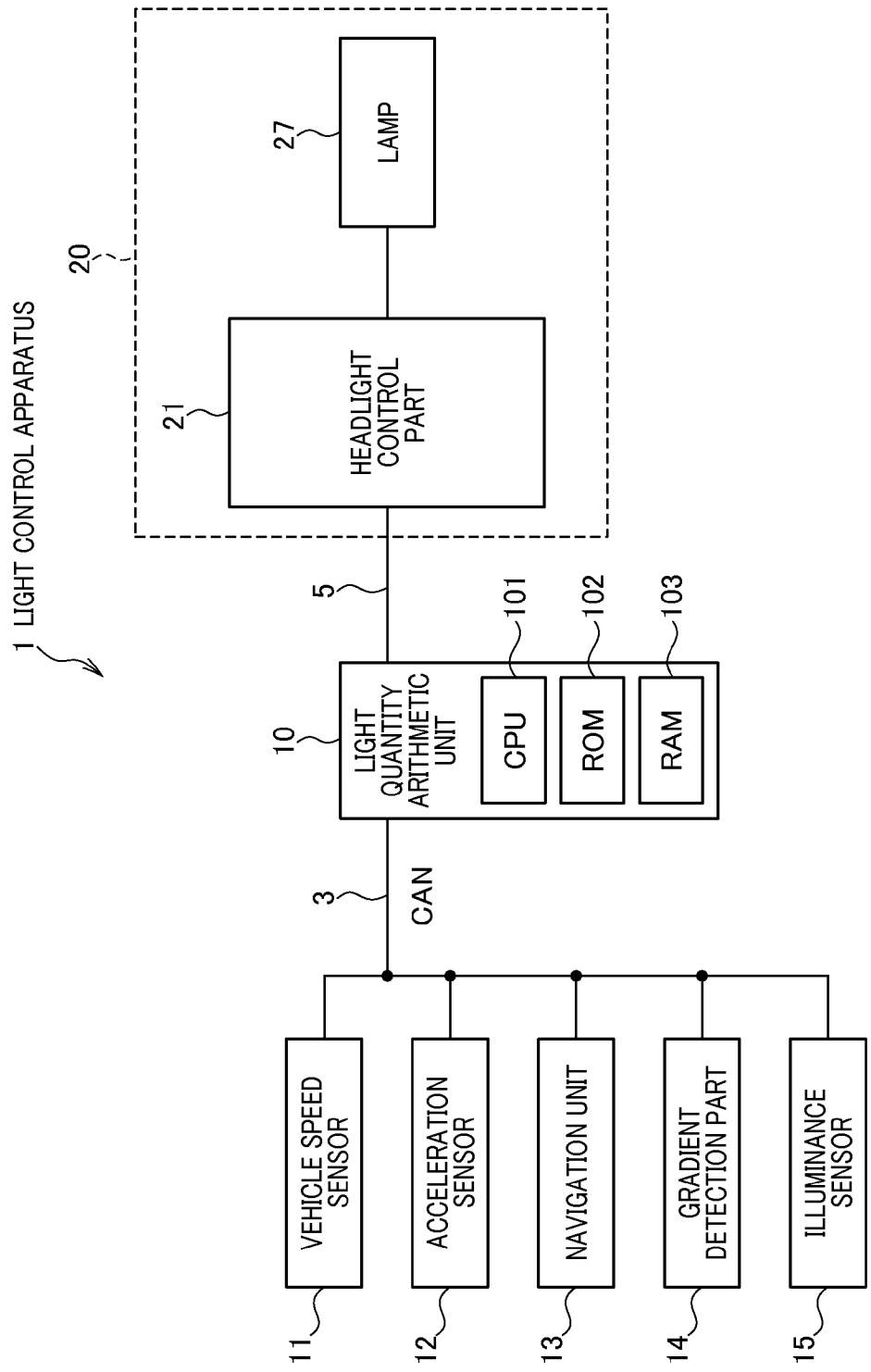

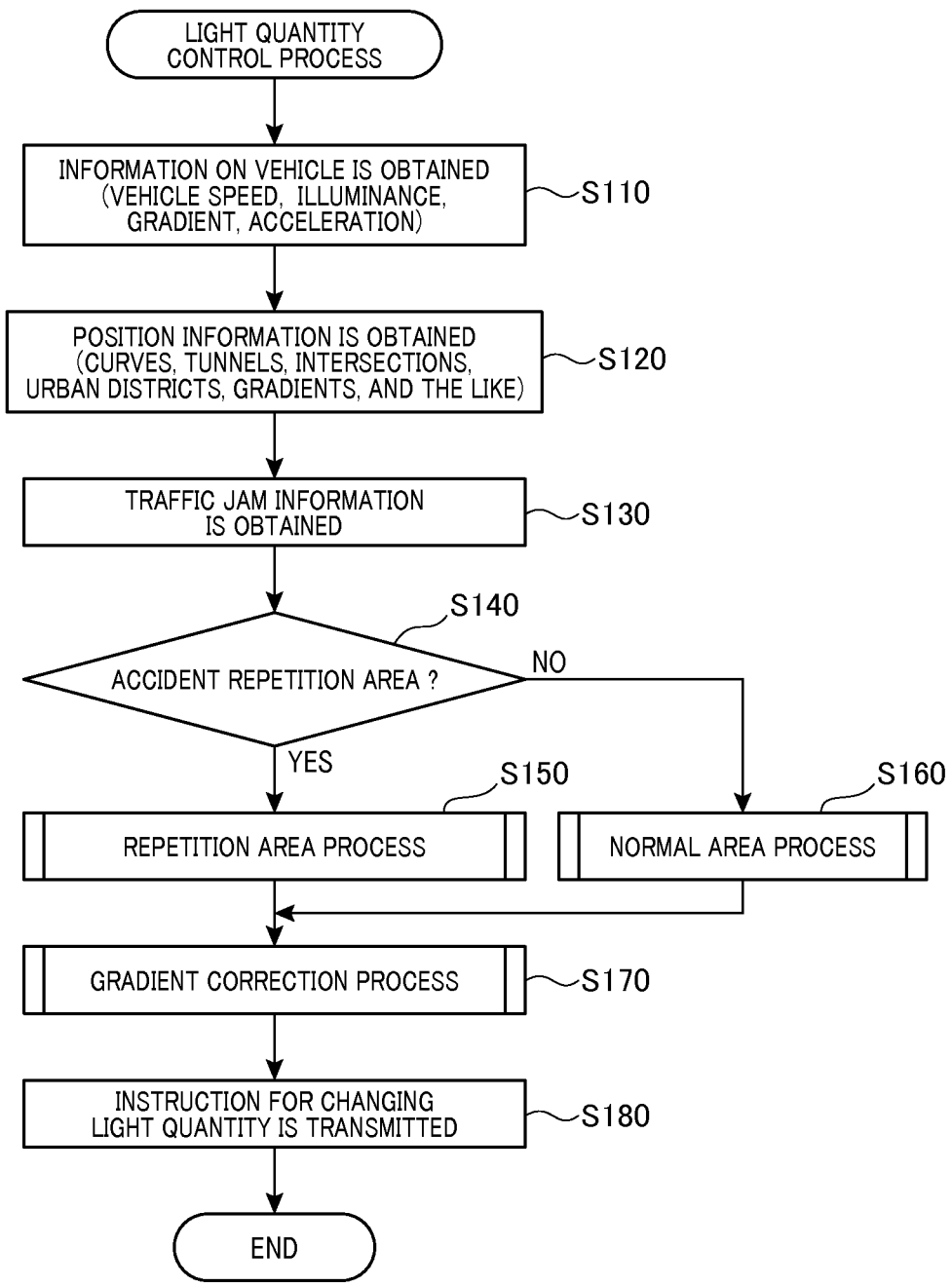

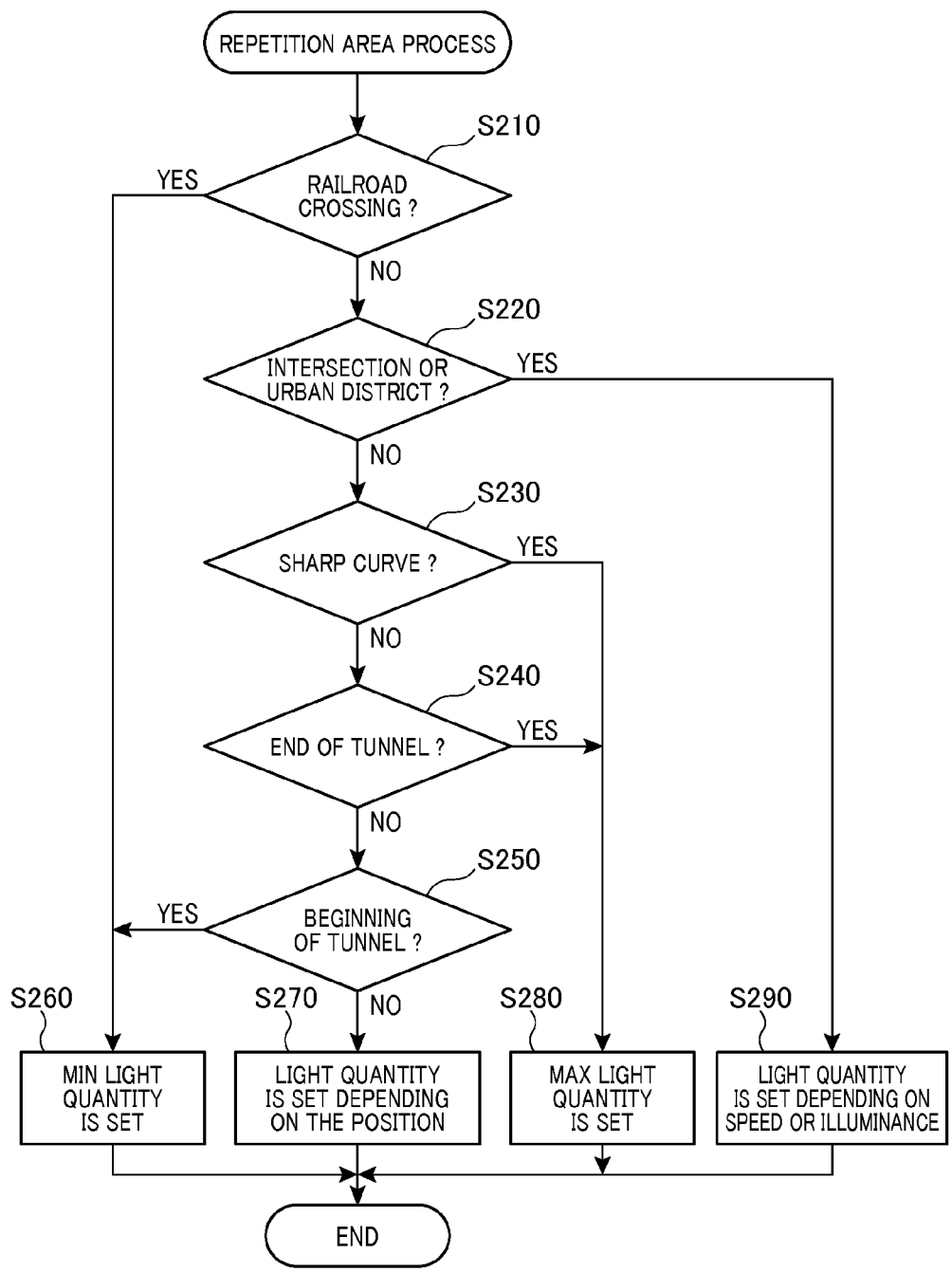

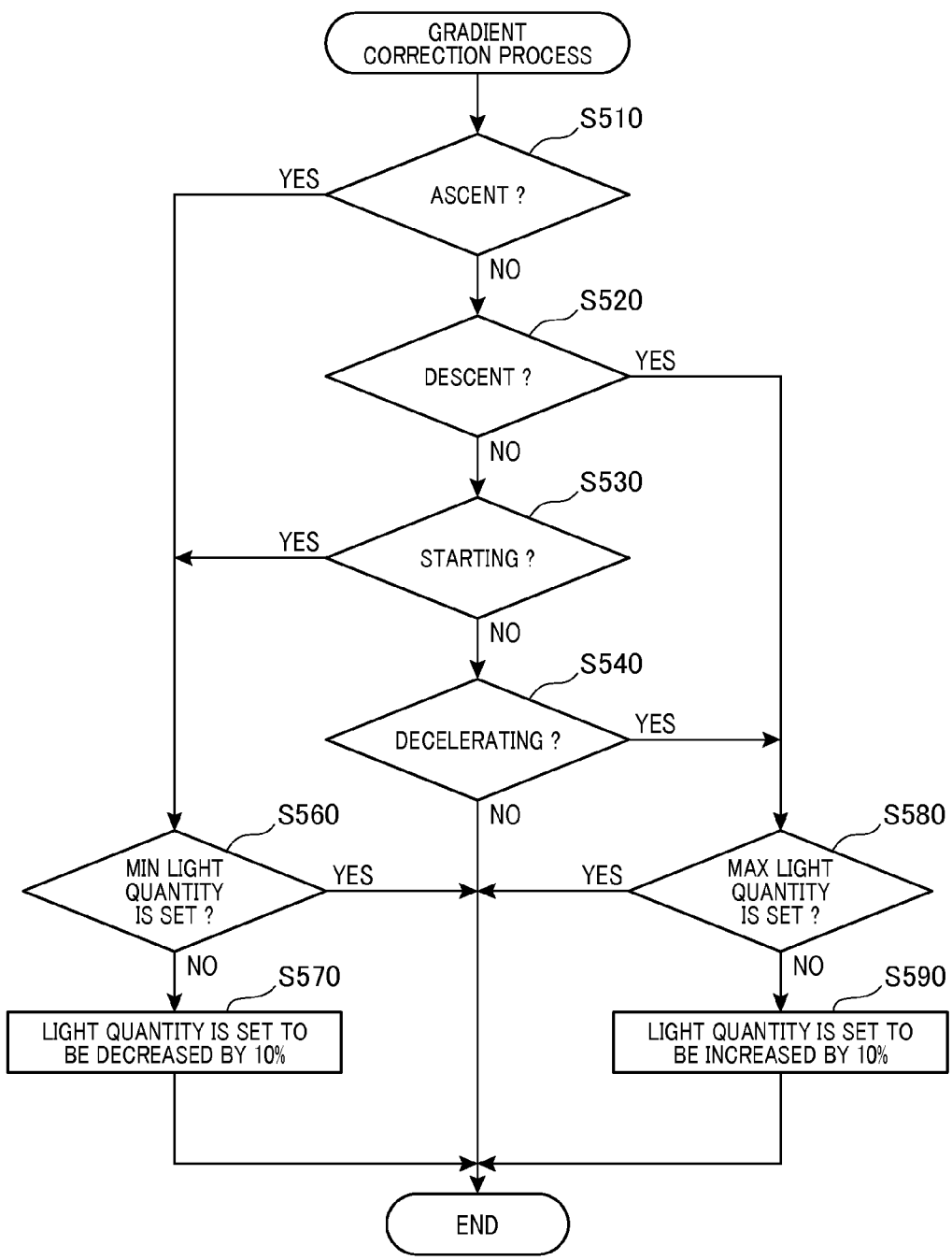

LIGHT QUANTITY CONTROL APPARATUS AND STORAGE MEDIUM

CROSS-REFERENCE TO RELATED APPLICATION

This application is based on and claims the benefit of priority from earlier Japanese Patent Application No. 2010-275815 filed Dec. 10, 2010, the description of which is incorporated herein by reference.

BACKGROUND

1. Technical Field

The present invention relates to a light quantity control apparatus and storage medium which control light quantity of a light installed in a vehicle.

2. Related Art

An example of the light quantity control apparatus is known which controls light quantity of headlights depending on vehicle speed and illuminance around the vehicle (refer to JP-A-2005-335485).

The above light quantity control apparatus cannot detect circumstances around the vehicle other than the illuminance. Hence, if the lights are bright more than necessary, electric power is unnecessarily consumed by the lights. In addition, according to circumstances, excessively bright light can lower visibility when trying to distinguish pedestrians and the like from the peripheral vehicles. Conversely, excessively dark light lowers visibility of the driver of the own vehicle using the lights.

SUMMARY

An embodiment provides a light quantity control apparatus and a storage medium which control light quantity of a light installed in a vehicle. The apparatus and storage medium can reduce power consumption of the light without lowering visibility as much as possible.

As an aspect of the embodiment, a light quantity control apparatus, which controls light quantity of a light installed in a vehicle, includes: a traffic jam information obtaining unit which obtains traffic jam information including information on positions and information on presence/absence of a traffic jam at each of the positions; an own vehicle position obtaining unit which obtains a position of an own vehicle; a traffic jam identifying unit which identifies whether or not the own vehicle is in a traffic jam based on the traffic jam information and the position of the own vehicle; a traffic-jam-time light quantity control unit which decreases the light quantity of the light compared with a normal time if the own vehicle is in a traffic jam; an urban district obtaining unit which obtains information on whether or not the own vehicle is in an urban district or near an intersection; and an urban-district-traveling-time light quantity control unit which decreases the light quantity of the light compared with a case where the own vehicle is in an area other than urban districts and intersections if the own vehicle is in the urban district or near an intersection, wherein whether or not the own vehicle is in the urban district is determined based on map data or density of buildings around the own vehicle.

BRIEF DESCRIPTION OF THE DRAWINGS

In the accompanying drawings:

FIG. 1 is a block diagram showing a schematic configuration of a light control apparatus;

FIG. 2 is a flowchart showing a light quantity control process;

FIG. 3 is a flowchart showing a repetition area process;

FIG. 6 is a flowchart showing a gradient correction process.

DETAILED DESCRIPTION OF THE PREFERRED EMBODIMENTS

Figure 4A:
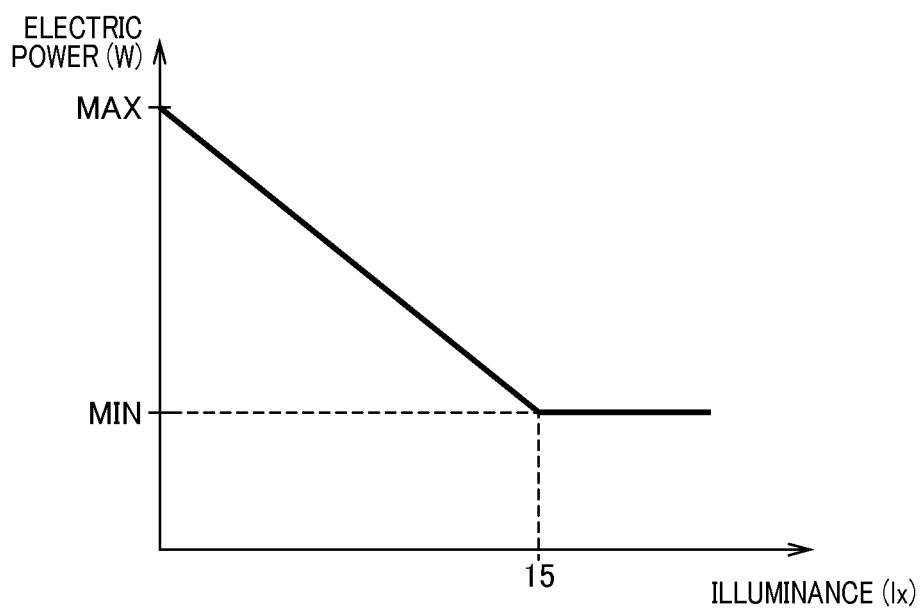
FIG. 4A is a graph showing a relationship between electric power supplied to headlights and illuminance.

With reference to the accompanying drawings, hereinafter are described embodiments. Throughout the drawings, components identical with or similar to each other are given the same numerals for the sake of omitting unnecessary explanation.

Configurations of the Present Embodiment

FIG. 1 is a block diagram showing a schematic configuration of a light control apparatus 1.

The light control apparatus 1 is installed in a vehicle such as a passenger car (hereinafter, also referred to as "own vehicle"). As shown in FIG. 1, the light control apparatus 1 includes a light quantity arithmetic unit 10 (light quantity control apparatus), a vehicle speed sensor 11, an acceleration sensor 12, a navigation unit 13, a gradient detection part 14, and an illuminance sensor 15, all of which are connected to each other via a CAN communication line 3 through which communication is performed under the communication protocol CAN (Controller Area Network). In addition, the light quantity arithmetic unit 10 is also connected to headlights 20, 20 (one of the headlights is shown) via cables 5, 5 (one of the cables is shown) formed as normal communication lines.

The vehicle speed sensor 11 detects traveling speed of the own vehicle and transmits the detection result to the light quantity arithmetic unit 10 via the CAN communication line 3. The acceleration sensor 12 detects acceleration (including deceleration) applied to the own vehicle and transmits the detection result to the light quantity arithmetic unit 10.

The navigation unit 13 has a known function for displaying the position of the own vehicle on a display based on map information. In addition, the navigation unit 13 has a function for obtaining traffic jam information to display the traffic jam information on the display and a function for transmitting information on the present position of the own vehicle, information on the classification of roads (in an urban district, a suburb, an expressway, or the like) on which the own vehicle is traveling, information on presence/absence of a curve, a railroad crossing, a gradient, or a tunnel, and information on a traffic jam, to a unit which is the source of a request (light quantity arithmetic unit 10) in response to an external request.

The gradient detection part 14 includes vehicle height sensors (not shown) each of which measures the vehicle height in the vicinity of each of the wheels of the own vehicle. The gradient detection part 14 detects the amount of gradient, which represents the degree of the gradient of the own vehicle in the front-back direction and the lateral direction, based on the information obtained from the vehicle height sensors. The gradient detection part 14 transmits the detection result to the light quantity arithmetic unit 10. The illuminance sensor 15 is formed as a known sensor which detects brightness (illuminance) around the own vehicle and transmits the detection result of the illuminance to the light quantity arithmetic unit 10.

The light quantity arithmetic unit 10 is configured as a known microcomputer including a CPU (central processing unit) 101, a ROM (read only member) 102, and a RAM (random access memory) 103 and the like. The light quantity arithmetic unit 10 receives the detection results of various sensors connected thereto, via the CAN communication line 3. The light quantity arithmetic unit 10 performs a process for determining the light quantity from the headlight 20.

Note that the light quantity arithmetic unit 10 is configured so as to store the information obtained via the communication lines 3 and 5 in the RAM thereof. The light quantity arithmetic unit 10 transmits a control instruction (PWM signal) specifying the light quantity to the headlight 20 via the cable 5.

The headlights 20 are arranged at two positions, the left and right of the front of the vehicle, as in the case of well-known vehicles. Control instructions are transmitted from the light quantity arithmetic unit 10 to the left and right headlights 20. Note that, in FIG. 1, one of the left and right headlights 20 is shown.

Each of the headlights 20 includes, as shown in FIG. 1, a headlight control part 21 and a lamp 27. The headlight control part 21 is configured as a known microcomputer including a CPU, a ROM, and a RAM and the like. The headlight control part 21 performs a process for controlling the light quantity of the lamp 27 based on a control instruction of the light quantity arithmetic unit 10. Note that the headlight control part 21 may be configured as a circuit which controls the light quantity of the lamp 27 in accordance with the control instruction (PWM signal or the like).

Process of the Present Embodiment

Next, a process for setting the light quantity of irradiation light of the headlight 20, which is performed in the light control apparatus 1, will explained with reference to FIG. 2. FIG. 2 is a flowchart showing the light quantity control process performed by the light quantity arithmetic unit 10. The CPU 101 (computer) of the light quantity arithmetic unit 10 performs the light quantity control process by executing a light quantity control program stored in the ROM 102 (storage medium). That is, the program is computer readable.

The light quantity control process starts when the switch for the headlights 20 of the vehicle is turned on. Thereafter, the light quantity control process is repeated. Specifically, as shown in FIG. 2, information on the own vehicle (S110: gradient obtaining means (unit)) is obtained. The information on the own vehicle obtained by this process includes, for example, speed of the own vehicle detected by the vehicle speed sensor 11, illuminance around the own vehicle detected by the illuminance sensor 15, the gradient of the own vehicle in the front-back direction (vertical direction) (the fact that the own vehicle is inclined in the front-back direction) detected by the gradient detection part 14, and acceleration of the own vehicle detected by the acceleration sensor 12.

Next, position information is obtained from the navigation unit 13 (S120: own vehicle position obtaining means (unit), gradient obtaining means (unit), visibility information obtaining means (unit)). The position information obtained in this process includes, for example, information regarding positions such as curves and tunnels where visibility of a road or illuminance varies, information regarding positions such as railroad crossings where a vehicle vibrates in the front-back direction, information on the position of the own vehicle, information on the classification of urban districts (town mode), suburbs (country mode), and freeways (motorway mode), information on the rate of accident on the road on which the own vehicle travels, and the like. In addition, as information on curves, information on curvatures or curvature radiuses (turning radiuses) is included.

Next, traffic jam information is obtained from the navigation unit 13 (S130: traffic jam information obtaining means (unit)). Although the traffic jam information is well-known, this traffic jam information includes information on a plurality of positions and information on presence/absence of a traffic jam at each of the positions.

Next, it is determines whether or not the own vehicle is traveling in an accident repetition area (S140). This determination is performed by using the information on the rate of accidents. If the own vehicle is traveling in an accident repetition area (S140: YES), the light quantity arithmetic unit 10 performs a repetition area process (S150).

The repetition area process will be described with reference to the flowchart shown in FIG. 3. In the repetition area process, the light quantity of the lights is set in places where the number of accidents is relatively large.

Specifically, as shown in FIG. 3, it is determined first whether or not the own vehicle is approaching a railroad crossing (S210). Next, it is determined whether or not the own vehicle is traveling near an intersection or in an urban district (S220). Next, it is determined whether or not the own vehicle is approaching a sharp curve (S230). Next, it is determined whether or not the own vehicle is approaching the beginning or the end of a tunnel (S240, S250: illuminance variation detecting means (unit)). The determination whether or not the own vehicle is approaching a railroad crossing is performed for predicting that the directions of the light axes of the lights of the own vehicle vary. Specifically, it may be determined whether or not the own vehicle is within the range of several meters (for example, 5 m) from the railroad crossing.

The determination whether or not the own vehicle is traveling near an intersection or in an urban district and whether or not the own vehicle is approaching a sharp curve is performed by considering the visibility range and dazzling of others (other vehicles, pedestrians and the like). Specifically, it may be determined whether or not the own vehicle is traveling within the distance range where irradiation of the headlights 20 reaches an intersection, a sharp curve and the like. In addition, the determination whether or not the own vehicle is approaching the beginning or the end of a tunnel is performed by detecting the variation of illuminance around the own vehicle to consider light adaptation and dark adaptation of the driver of the own vehicle. Specifically, it may be determined whether or not the own vehicle is within the range of several meters (for example, 5 m) from the beginning or the end of a tunnel.

Note that the sharp curve in the present embodiment means a curve having a radius smaller than a predetermined radius which is a turning radius at which it is predicted that visibility becomes worse. If the own vehicle is approaching a railroad crossing (S210: YES), the light quantity of the headlights is set to the settable minimum light quantity (S260: inclined-time light quantity control means (unit), illuminance-variation-time light quantity control means (unit)). Then, the repetition area process is completed. Note that, in the present embodiment, even when the light quantity of the headlights is set to the settable minimum light quantity, the light quantity is set to a value equal to or more than the value required under the law.

If the own vehicle is traveling near an intersection or in an urban district (S210: No, S220: YES), the light quantity corresponding to the speed of the own vehicle and the illuminance around the own vehicle is set (S280: illuminance-variation-time light quantity control means (unit), visibility light quantity control means (unit)). Then, the repetition area process is completed. In the process of S280, for example, when light quantity is set depending on the illuminance around the own vehicle, as shown in FIG. 4A, electric power supplied to the headlights 20 is set to be smaller so that the light quantity thereof becomes smaller as the illuminance around the own vehicle becomes larger, to prevent the electric power of the required minimum light quantity (light quantity required by the law) from becoming lower than the corresponding electric power.

Figure 4B:
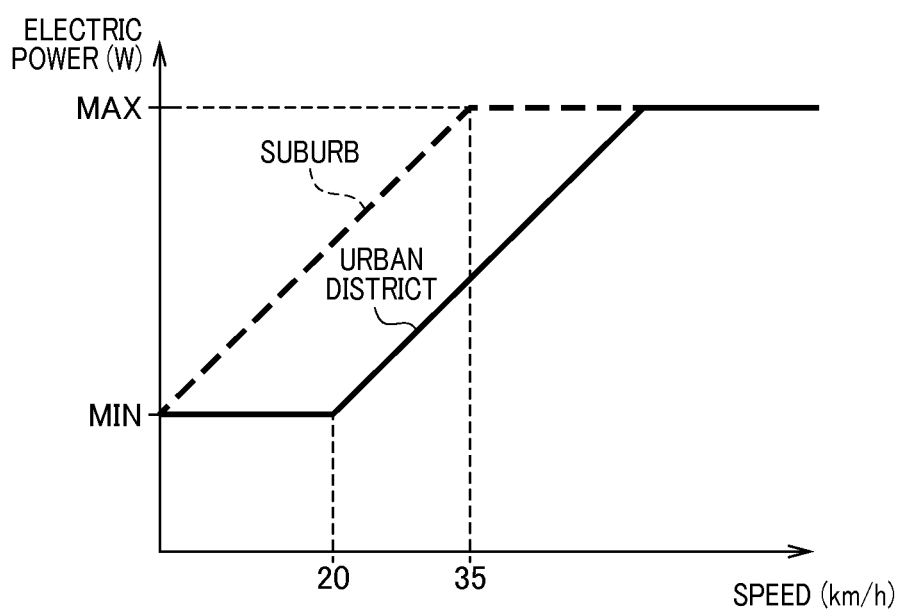
FIG. 4B is a graph showing a relationship between electric power supplied to headlights and speed.

When light quantity is set depending on the speed of the own vehicle, as shown by the solid line in FIG. 4B, electric power supplied to the headlights 20 is set to be larger so that the light quantity thereof becomes larger as the speed of the own vehicle becomes higher. Note that, even in this case, the electric power of the required minimum light quantity (light quantity required by the law) is required to be prevented from becoming lower than the corresponding electric power.

If the own vehicle is approaching a sharp curve (S210: NO, S220: NO, S230: YES), the electric power supplied to the headlights 20 is set so that the light quantity thereof becomes maximum (S280). Then, the repetition area process is completed. If the own vehicle is approaching the end of a tunnel (S210 to S230: NO, S240: YES), the electric power supplied to the headlights 20 is set so that the light quantity thereof becomes maximum (S280) as in the case where the own vehicle is approaching a sharp curve. Then, the repetition area process is completed.

If the own vehicle is approaching the beginning of a tunnel (S210 to S240: NO, S250: YES), the light quantity of the headlights is set to the settable minimum light quantity (S260). Then, the repetition area process is completed. If the own vehicle is not approaching any of a railroad crossing, an intersection, a sharp curve, and the beginning and the end of a tunnel, and is not traveling in an urban district (S210 to S250: NO), the light quantity of the headlights 20 is set depending on the position where the own vehicle is traveling (S270). Then, the repetition area process is completed.

In the process of S270, for example, as in the process of S290, a configuration can be considered in which the light quantity of the headlights 20 is set depending on the speed of the own vehicle or the illuminance around the own vehicle.

Figure 5:
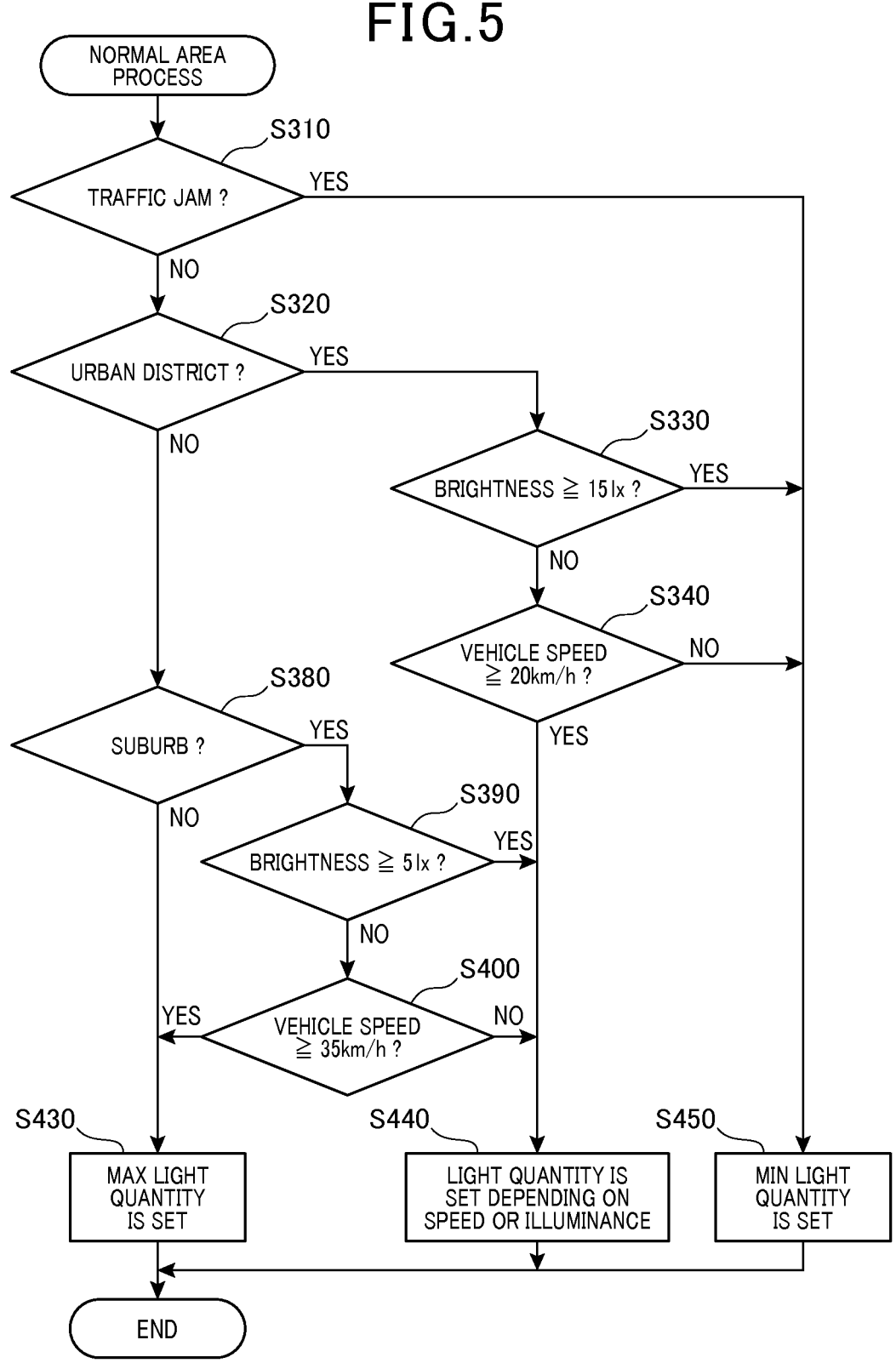
FIG. 5 is a flowchart showing a normal area process.

Meanwhile, in the process of S140 shown in FIG. 2, if the own vehicle is not traveling in an accident repetition area (S140: NO), a normal area process is performed (S160). The normal area process will be explained with reference to the flowchart shown in FIG. 5.

In the normal area process, the light quantity of the headlights 20 is set when the own vehicle is not traveling in an accident repetition area. Specifically, first, it is determined whether or not the road on which the own vehicle is traveling is in a traffic jam (S310: traffic jam identifying means (unit)). In this process, it is identified whether or not the own vehicle is in a traffic jam based on the traffic jam information and the position of the own vehicle.

If the road on which the own vehicle is traveling is in a traffic jam (S310: YES), the light quantity of the headlights 20 is set to the settable minimum light quantity (S450: traffic-jam-time light quantity control means (unit)). Then, the normal area process is completed. If the road on which the own vehicle is traveling is not in a traffic jam (S310: NO), it is determined whether or not the own vehicle is traveling in an urban district or a suburb (S320: urban district obtaining means (unit), S380). In this process, it is determined whether the road on which the own vehicle is traveling is in an urban district, a suburb, or an expressway by using the information on the classification of roads.

If the road on which the own vehicle is traveling is in an urban district (S320: YES), it is determined whether or not the brightness around the own vehicle is equal to or more than the brightness (e.g. 15 lux) serving as a first criterion by which it is determined to be slightly dark (S330), and whether or not the traveling speed of the own vehicle is the speed (e.g. 20 km/h or more) serving as a first criterion by which it is determined that the own vehicle cannot immediately stop (S340). If the brightness around the own vehicle is more than the brightness serving as the first criterion (S330: YES), or the traveling speed of the own vehicle is less than the speed serving as the first criterion (S330: NO, S340: NO), the light quantity of the headlights 20 is set to the settable minimum light quantity (S450: urban-district-traveling-time light quantity control means (unit)). Then, the normal area process is completed.

If the brightness around the own vehicle is lower than the brightness serving as the first criterion (S330: NO), and the traveling speed of the own vehicle is equal to or more than the speed serving as the first criterion (S340: YES), the light quantity corresponding to the speed of the own vehicle and the illuminance around the own vehicle is set (S440). Then, the normal area process is completed. In this case, in the process of S440, the light quantity of the headlight 20 is set as in the process of S290.

Next, if the own vehicle is traveling in a suburb (S380: YES), it is determined whether or not the brightness around the own vehicle is equal to or higher than the brightness (e.g. 5 lux) serving as a second criterion which is lower than the brightness serving as the first criterion (S390), and whether or not the traveling speed of the own vehicle is the speed (e.g. 35 km/h or more) serving as a second criterion which is higher than the speed serving as the first criterion (S400). If the brightness around the own vehicle is more than the brightness serving as the second criterion (S390: YES), or the traveling speed of the own vehicle is less than the speed serving as the second criterion (S390: NO, S400: NO), the light quantity depending on the speed of the own vehicle or the illuminance around the own vehicle is set (S440). Then, the normal area process is completed.

The process of S440 may be the same as the process of S290. However, when setting the light quantity of the headlights 20 depending on the speed, as shown by the broken line shown in FIG. 4B, the light quantity of the headlights 20 may be set so that the brightness becomes higher compared with the case where the own vehicle is traveling in an urban district.

If the brightness around the own vehicle is less than the brightness serving as the second criterion (S390: NO), and the traveling speed of the own vehicle is equal to or more than the speed serving as the second criterion (S400: YES), the light quantity of the headlights 20 is set to be maximum (S430). Then, the normal area process is completed.

Next, if the own vehicle is traveling in an area other than urban districts and suburbs (i.e. an expressway) (S320: NO, S380: NO), the light quantity of the headlights 20 is set to be maximum (S430). Then, the normal area process is completed.

After the repetition area process and the normal area process are completed, a gradient correction process in FIG. 2 is performed. The gradient correction process will be explained with reference to the flowchart shown in FIG. 6. In the gradient correction process, the light quantity of the headlights 20 set in the repetition area process or the normal area process is corrected depending on whether or not the own vehicle is inclined (i.e. whether the optical axes of the headlights 20 are inclined in the upper direction or the lower direction).

In the gradient correction process, as shown in FIG. 6, it is determined whether or not the road has a gradient (e.g. gradient of 4% or more) at the position of the own vehicle (S510: inclined-time light quantity control means (unit), S520). In addition, it is also determined whether the own vehicle is starting (accelerating) or decelerating (S530: inclined-time light quantity control means (unit), S540).

Whether or not the road has a gradient at the position of the own vehicle is determined based on, for example, the map information of the navigation unit 13. Whether or not the own vehicle is starting or decelerating is determined based on whether or not the acceleration (absolute value) detected by the acceleration sensor 12 is equal to or more than the acceleration by which the optical axes of the headlights 20 of the own vehicle move in the upper direction or the lower direction.

If the road has a rising gradient at the position of the own vehicle (S510: YES), or the own vehicle is starting (S510: NO, S520: NO, S530: YES), the light quantity of the headlights 20 is reset so as to decrease by 10% (S560: NO, S570: inclined-time light quantity control means (unit)) assuming that the optical axes of the headlights 20 move in the upper direction. Note that when it is determined whether or not the light quantity of the headlights 2 is minimum (S560) before the process of S570, and if it is determined that the light quantity of the headlights 2 is already minimum (S560: YES), the gradient correction process is completed without changing the setting of the light quantity. That is, in the processes of S560 and S570, the light quantity is not set to a value less than the minimum light quantity.

If the road has a falling gradient at the position of the own vehicle (S510: NO, S520: YES), or the own vehicle is decelerating (S510 to S530: NO, S540: YES), the light quantity of the headlights 20 is reset so as to increase by 10% (S580: NO, S590) assuming that the optical axes of the headlights 20 move in the lower direction. Note that when it is determined whether or not the light quantity of the headlights 2 is maximum (S580) before the process of S590, and if it is determined that the light quantity of the headlights 2 is already maximum (S580: YES), the gradient correction process is completed without changing the setting of the light quantity. That is, in the processes of S580 and S590, the light quantity is not set to a value less than the minimum light quantity.

When the gradient correction process is completed, a control instruction (PWM signal) corresponding to the set light quantity is transmitted to the headlights 20 (S180: traffic-jam-time light quantity control means (unit), urban-district-traveling-time light quantity control means (unit), illuminance-variation-time light quantity control means (unit), visibility light quantity control means (unit)). Then, the light quantity control process is completed.

Advantages of the Present Embodiment

In the light quantity arithmetic unit 10 described above, traffic jam information is obtained which includes information on positions and information on presence/absence of a traffic jam at each of the positions, and the position of the own vehicle is obtained. Then, the light quantity arithmetic unit 10 identifies whether or not the own vehicle is in a traffic jam based on the traffic jam information and the position of the own vehicle. If the own vehicle is in a traffic jam, the light quantity arithmetic unit 10 decreases the light quantity of the lights compared with the normal time.

The light quantity arithmetic unit 10 decreases the light quantity of the lights, when the own vehicle is in a traffic jam and cannot travel at high speed and the driver of the own vehicle is not all that required to visually identify a wide area (long distance). Hence, the power consumption of the lights can be reduced without lowering visibility as much as possible.

In addition, the light quantity arithmetic unit 10 determines whether or not the own vehicle is in an urban district. If the own vehicle is in an urban district, the light quantity of the lights is decreased compared with the case where the own vehicle is in an area other than the urban districts.

According to the light quantity arithmetic unit 10, since the light quantity of the lights is decreased when the own vehicle is in an urban district, dazzling of pedestrians and other vehicles can be prevented while decreasing the power consumption. In addition, since urban districts are relatively bright, visibility can easily be ensured even when the light quantity of the lights is decreased.

In addition, the light quantity arithmetic unit 10 decreases the light quantity of the lights compared with the case where the own vehicle is not inclined in the front-back direction, when the own vehicle obtains the information on the fact that the own vehicle is inclined in the front-back direction, and the optical axes of the lights move in the upper direction due to the inclination of the own vehicle.

According to the light quantity arithmetic unit 10, the light quantity of the lights can be decreased when it is predicted that pedestrians and other vehicles are dazzled by the movement of the optical axes of the lights of the own vehicle in the upper direction.

In addition, the light quantity arithmetic unit 10 detects the variation of the illuminance around the own vehicle. When the illuminance around the own vehicle has varied to be higher, the light quantity arithmetic unit 10 decreases the light quantity of the lights. When the illuminance around the own vehicle has varied to be lower, the light quantity arithmetic unit 10 increases the light quantity of the lights.

According to the light quantity arithmetic unit 10, when the driver of the own vehicle is light-adapted, the light quantity of the lights is decreased because the brightness of the lights is not required so much to visually identify the periphery of the own vehicle. When the driver of the own vehicle is dark-adapted, the light quantity of the lights is increased because the brightness of the lights is required to be sufficient. Hence, the light quantity of the lights can be set so as to correspond to light adaptation and dark adaptation of the driver.

Furthermore, the light quantity arithmetic unit 10 obtains visibility information which represents good/poor visibility on the road around the own vehicle. When it is determined that the visibility around the own vehicle is poor based on the visibility information, the light quantity arithmetic unit 10 increases the light quantity of the lights.

According to the light quantity arithmetic unit 10, since the light quantity is increased at the place where the visibility is poor, the visibility at the place where the visibility is poor can be ensured even when the light quantity is decreased at the place where the visibility is good.

In addition, in the light quantity arithmetic unit 10, when the light quantity of the headlights is decreased, each of the light quantity control means sets the lower limit of the light quantity of the lights to a value equal to or more than the value of light quantity required under the law.

According to the light quantity arithmetic unit 10, when the light quantity of the headlights has been equal to or more than the value of light quantity required under the law, and the light quantity is decreased, the light quantity of the lower limit under the law can be ensured.

It will be appreciated that the present invention is not limited to the configurations described above, but any and all modifications, variations or equivalents, which may occur to those who are skilled in the art, should be considered to fall within the scope of the present invention.

Other Embodiments In the above embodiment, since positions on a map are related to the determination whether or not each of the position is in an urban district in the map data, the data is used when determining whether or not the own vehicle is in an urban district. However, when positions on the map are not related to the determination whether or not each of the position is in an urban district in the map data, it may be determined whether or not the own vehicle is in an urban district based on whether or not the density of buildings around the own vehicle, which is included in the map data, exceeds a predetermined threshold value.

In the above embodiment, the above processes are performed when controlling the light quantity of the headlights 20. However, the above processes may be performed when controlling the light quantity of the lights (tail lights, fog lights, or the like) other than the headlights 20.

Hereinafter, aspects of the above-described embodiments will be summarized.

In a light quantity control apparatus having a first configuration, a traffic jam information obtaining unit obtains traffic jam information including information on positions and information on presence/absence of a traffic jam at each of the positions. An own vehicle position obtaining unit obtains a position of an own vehicle. A traffic jam identifying unit identifies whether or not the own vehicle is in a traffic jam based on the traffic jam information and the position of the own vehicle. A traffic-jam-time light quantity control unit decreases the light quantity of the light compared with a normal time, during which the own vehicle is not in a traffic jam, if the own vehicle is in a traffic jam. Note that the own vehicle indicates a vehicle in which the light quantity control apparatus is installed.

The light quantity control apparatus decreases the light quantity of the light, when the own vehicle is in a traffic jam and cannot travel at high speed and the driver of the own vehicle is not all that required to visually identify a wide area (long distance). Hence, the power consumption of the light can be reduced as much as possible without lowering visibility.

The light quantity control apparatus having a second configuration may include an urban district obtaining unit which obtains information on whether or not the own vehicle is in an urban district, and an urban-district-traveling-time light quantity control unit which decreases the light quantity of the light compared with a case where the own vehicle is in an area other than urban districts if the own vehicle is in the urban district According to the light quantity control apparatus, since the light quantity of the light is decreased when the own vehicle is in an urban district, dazzling of pedestrians and other vehicles can be prevented while decreasing the power consumption. In addition, since urban districts are relatively bright, visibility can easily be ensured even when the light quantity of the light is decreased.

Note that when a plurality of light quantity control units control the light quantity of the same light, priority may be assigned to the controls to give priority to the light quantity which is set by the light quantity control unit having high priority. Alternatively, the light quantity may be set by accumulating the change amount of the light quantity set by each of the light quantity control units. In addition, if positions on a map are related to the determination whether or not each of the position is in an urban district in the map data, the data may be used when determining whether or not the own vehicle is in an urban district. If positions on a map are not related to the determination whether or not each of the position is in an urban district in the map data, it may be determined whether or not the own vehicle is in an urban district based on whether or not the density of buildings around the own vehicle, which is included in the map data, exceeds a predetermined threshold value.

The light quantity control apparatus having a third configuration may include a gradient obtaining unit which obtains information on the fact that the own vehicle is inclined in the front-back direction, and an inclined-time light quantity control unit which decreases the light quantity of the light compared with a case where the own vehicle is not inclined in the front-back direction, when an optical axis of the light moves in the upper direction due to inclination of the own vehicle in the front-back direction.

According to the light quantity control apparatus, the light quantity of the lights can be decreased when it is predicted that pedestrians and other vehicles are dazzled by the movement of the optical axes of the lights of the own vehicle in the upper direction.

The light quantity control apparatus having a fourth configuration may include an illuminance variation detecting unit which detects variation of illuminance around the own vehicle, and an illuminance-variation-time light quantity control unit which decreases the light quantity of the light when the illuminance around the own vehicle has varied to be higher, and which increases the light quantity of the light when the illuminance around the own vehicle has varied to be lower.

According to the light quantity control apparatus, when the driver of the own vehicle is light-adapted, the light quantity of the light is decreased because the brightness of the light is not all that required to visually identify the periphery of the own vehicle. When the driver of the own vehicle is dark-adapted, the light quantity of the light is increased because the brightness of the light is required to be sufficient. Hence, the light quantity of the light can be set so as to correspond to light adaptation and dark adaptation of the driver.

The light quantity control apparatus having a fifth configuration may include a visibility information obtaining unit which obtains visibility information which represents good/poor of visibility on a road around the own vehicle, and a visibility light quantity control unit which increases the light quantity of the light when it is determined that the visibility around the own vehicle is poor based on the visibility information.

According to the light quantity control apparatus, since the light quantity is increased at the place where the visibility is poor, the visibility at the place where the visibility is poor can be ensured even when the light quantity is decreased at the place where the visibility is good.

In the light quantity control apparatus having a sixth configuration, the light quantity control unit may set a lower limit of the light quantity of the light to a value equal to or more than light quantity required under a law when the light quantity of the headlights is decreased.

According to the light quantity control apparatus, when the light quantity of the headlights has been equal to or more than the value of light quantity required under the law, and the light quantity is decreased, the light quantity of the lower limit under the law can be ensured.

In the program having a seventh configuration, a computer functions as respective means configuring the above light quantity control apparatus.

The light quantity control program can provide the same advantages as those of the light quantity control apparatus.

What is claimed is:

1. A light quantity control apparatus which controls light quantity of a light installed in a vehicle, comprising:
   a traffic jam information obtaining unit which obtains traffic jam information including information on positions and information on presence/absence of a traffic jam at each of the positions;
   an own vehicle position obtaining unit which obtains a position of an own vehicle;
   a traffic jam identifying unit which identifies whether or not the own vehicle is in a traffic jam based on the traffic jam information and the position of the own vehicle;
   a traffic-jam-time light quantity control unit which decreases the light quantity of the light compared with a normal time if the own vehicle is in a traffic jam;
   an urban district obtaining unit which obtains information on whether or not the own vehicle is in an urban district or near an intersection; and
   an urban-district-traveling-time light quantity control unit which decreases the light quantity of the light compared with a case where the own vehicle is in an area other than urban districts and intersections if the own vehicle is in the urban district or near an intersection, wherein
   whether or not the own vehicle is in the urban district is determined based on map data or density of buildings around the own vehicle.

2. The light quantity control apparatus according to claim 1, further comprising:
   a gradient obtaining unit which obtains information on the fact that the own vehicle is inclined in the front-back direction; and
   an inclined-time light quantity control unit which decreases the light quantity of the light compared with a case where the own vehicle is not inclined in the front-back direction, when an optical axis of the light moves in the upper direction due to inclination of the own vehicle in the front-back direction.

3. The light quantity control apparatus according to claim 1, further comprising:
   an illuminance variation detecting unit which detects variation of illuminance around the own vehicle; and
   an illuminance-variation-time light quantity control unit which decreases the light quantity of the light when the illuminance around the own vehicle has varied to be higher, and which increases the light quantity of the light when the illuminance around the own vehicle has varied to be lower.

4. The light quantity control apparatus according to claim 1, further comprising:
   a visibility information obtaining unit which obtains visibility information which represents good/poor of visibility on a road around the own vehicle; and
   a visibility light quantity control unit which increases the light quantity of the light when it is determined that the visibility around the own vehicle is poor based on the visibility information.

5. The light quantity control apparatus according to claim 1, wherein
   the light quantity control unit sets a lower limit of the light quantity of the light to a value equal to or more than light quantity required under a law when the light quantity of the light is decreased.

6. A light quantity control apparatus which controls light quantity of a light installed in a vehicle, comprising:
   a traffic jam information obtaining unit which obtains traffic jam information including information on positions and information on presence/absence of a traffic jam at each of the positions;
   an own vehicle position obtaining unit which obtains a position of an own vehicle;
   a traffic jam identifying unit which identifies whether or not the own vehicle is in a traffic jam based on the traffic jam information and the position of the own vehicle;
   a traffic-jam-time light quantity control unit which decreases the light quantity of the light compared with a normal time if the own vehicle is in a traffic jam;
   a gradient obtaining unit which obtains information on the fact that the own vehicle is inclined in the front-back direction; and
   an inclined-time light quantity control unit which decreases the light quantity of the light compared with a case where the own vehicle is not inclined in the front-back direction, when an optical axis of the light moves in the upper direction due to inclination of the own vehicle in the front-back direction.

7. The light quantity control apparatus according to claim 6, further comprising:
   an illuminance variation detecting unit which detects variation of illuminance around the own vehicle; and
   an illuminance-variation-time light quantity control unit which decreases the light quantity of the light when the illuminance around the own vehicle has varied to be higher, and which increases the light quantity of the light when the illuminance around the own vehicle has varied to be lower.

8. The light quantity control apparatus according to claim 6, further comprising:
   a visibility information obtaining unit which obtains visibility information which represents good/poor of visibility on a road around the own vehicle; and
   a visibility light quantity control unit which increases the light quantity of the light when it is determined that the visibility around the own vehicle is poor based on the visibility information.

9. The light quantity control apparatus according to claim 6, wherein
   the light quantity control unit sets a lower limit of the light quantity of the light to a value equal to or more than light quantity required under a law when the light quantity of the light is decreased.

10. A non-transitory storage medium which stores a computer readable program, the program comprising:
    obtaining traffic jam information including information on positions and information on presence/absence of a traffic jam at each of the positions;
    obtaining a position of an own vehicle;
    identifying whether or not the own vehicle is in a traffic jam based on the traffic jam information and the position of the own vehicle;
    decreasing light quantity of a light installed in the own vehicle compared with a normal time if the own vehicle is in a traffic jam;
    obtaining information on whether or not the own vehicle is in an urban district or near an intersection; and
    decreasing the light quantity of the light compared with a case where the own vehicle is in an area other than urban districts and intersections if the own vehicle is in the urban district or near an intersection, wherein whether or not the own vehicle is in the urban district is determined based on map data or density of buildings around the own vehicle.

11. A non-transitory storage medium which stores a computer readable program, the program comprising:
   obtaining traffic jam information including information on positions and information on presence/absence of a traffic jam at each of the positions;
   obtaining a position of an own vehicle;
   identifying whether or not the own vehicle is in a traffic jam based on the traffic jam information and the position of the own vehicle,
   decreasing light quantity of a light installed in the own vehicle compared with a normal time if the own vehicle is in a traffic jam;
   obtaining information on the fact that the own vehicle is inclined in the front-back direction; and
   decreasing the light quantity of the light compared with a case where the own vehicle is not inclined in the front-back direction, when an optical axis of the light moves in the upper direction due to inclination of the own vehicle in the front-back direction.

* * * * *